ns/
UNITED STATES PATENT OFFICE.

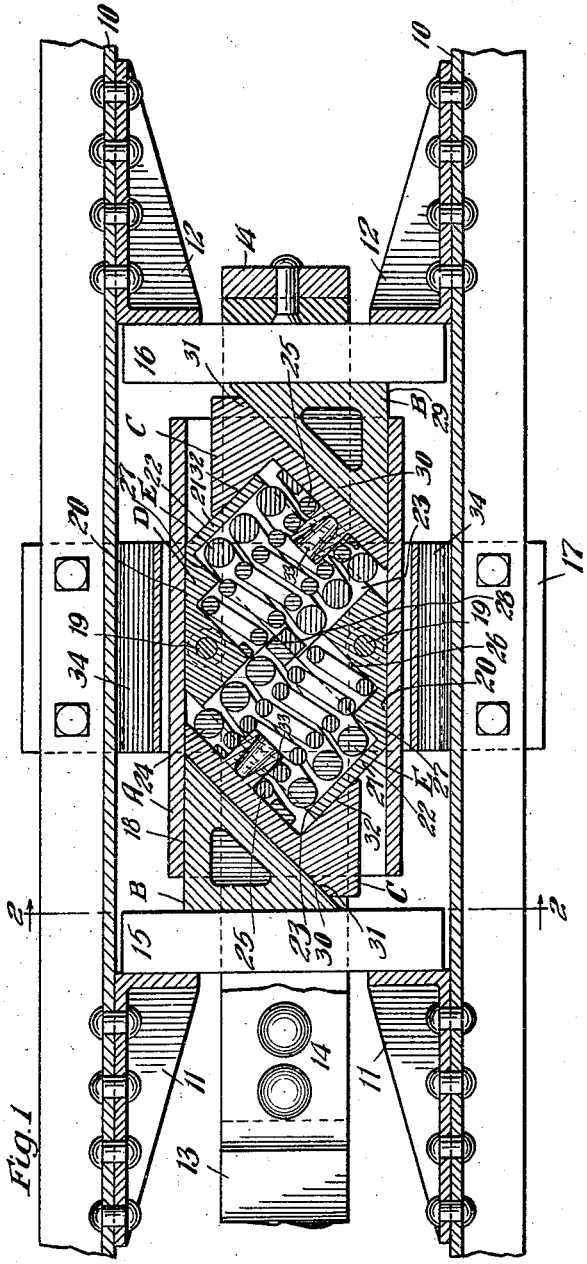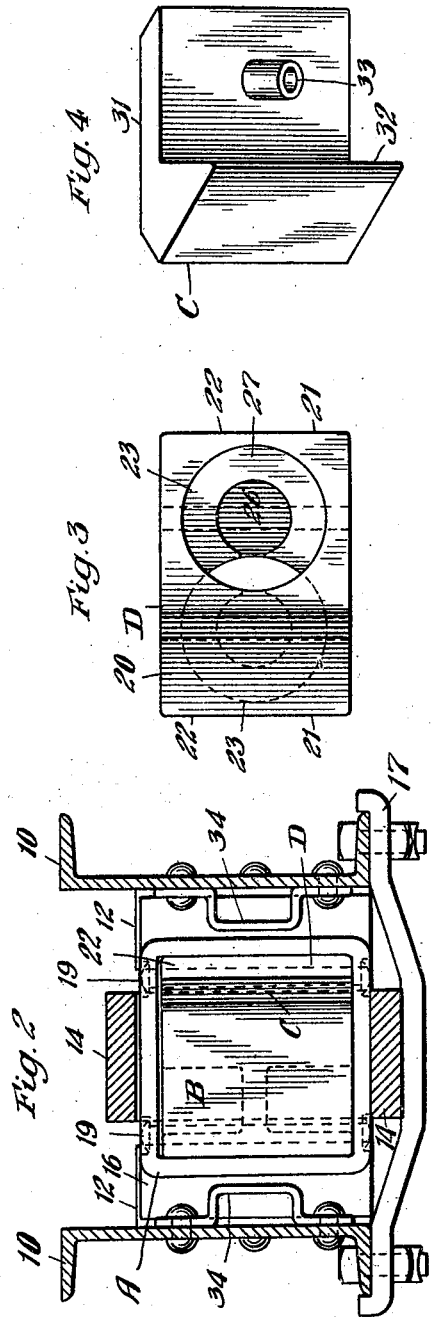

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,398,705.   Specification of Letters Patent.   Patented Nov. 29, 1921.

Application filed May 26, 1920. Serial No. 384,437.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a simple and efficient relatively inexpensive friction shock absorbing mechanism especially adapted for railway cars and wherein are provided a large number of wearing areas and the movement of the parts so governed as to produce high capacity.

In the drawing forming a part of this specification, Figure 1 is a horizontal longitudinal sectional view of a portion of a railway draft rigging showing my improvements in connection therewith. Fig. 2 is a vertical transverse sectional view corresponding substantially to the line 2—2 of Fig. 1. Fig. 3 is an end view of a stationary friction element employed within the friction shell in carrying out my improvements. And Fig. 4 is a perspective view of a friction shoe.

In said drawing, 10—10 denote channel-shaped center or draft sills of a railway car to the inner faces of which are secured front stop lugs 11 and rear stop lugs 12. A portion of a drawbar is indicated at 13 to which is rigidly attached a U-shaped yoke 14 of well known form, the shock absorbing mechanism proper, hereinafter described, and front and rear followers 15 and 16 being disposed within the yoke. The movable parts of the rigging are adapted to be supported by a detachable saddle plate 17.

The improved shock absorbing mechanism, as shown, comprises, broadly, a friction shell A; oppositely arranged combined wedge friction shoes B—B; a pair of friction shoes C—C; a fixed friction member D within the shell; and a pair of springs E—E.

The friction shell A, as shown, is of preferably rectangular outline and is provided with inner longitudinal extending flat friction surfaces 18—18, one at each end thereof and oppositely disposed. The friction member D is located centrally of the shell A and is held therein rigidly by any suitable means such as the rivets 19—19. Said member D is shown clearly in Fig. 3 in elevation. The same is of six-sided or hexagonal form, in horizontal section as shown in Fig. 1. The member D is provided with two opposite side walls 20—20 adapted to fit against the corresponding adjacent sides of the shell A, said side walls 20—20 being longitudinally offset as clearly indicated in Fig. 1. Adjacent one end of each of the side walls 20 is a diagonally extending wall or flange 21, said walls or flanges 21 being substantially diagonally opposite each other as shown in Fig. 1 and each extending at an angle of approximately 45° with respect to the center line of the rigging. Each of said walls 21 provides a flat outer friction surface 22, it being obvious that said surfaces 22 extend at approximately 45° to said center line. On the remaining sides of the member D, openings 23—23 are formed to receive the two diagonally extending springs E—E. Each of said springs E consists of an outer heavy coil 24 with an inner nested lighter coil 25. The bottoms of the openings 23 are countersunk as indicated at 26 to accommodate the extended ends of the inner nested coils 25, the heavy coils 24 bearing upon shoulders 27. In order to properly accommodate the mechanism within standard spacing of stops and to utilize commercial springs, the two openings 23 will be slightly overlapped as indicated in Fig. 3 which will bring a portion of one heavy coil 24 in line with and bearing against a corresponding portion of the other heavy coil 24 as indicated at 28. The member D is made separate from the shell to lessen the expense of manufacture but it will be noted that the member D, when in place, in effect forms a part of the shell A and might obviously be constructed integrally therewith, if desired.

The two wedge shoes B—B are of like construction and each is of triangular formation having an outer flat fricton surface 29 adapted to coöperate with the corresponding shell surface 18 and an inclined wedge friction surface 30. The outer end of each wedge shoe is obviously adapted to bear against the adjacent end follower.

Each of the friction shoes C is formed with a friction wedge surface 31 coöperable with the corresponding friction wedge surface 30. In addition, each shoe C is formed with an interior friction surface 32 adapted to coöperate with the corresponding friction surface 22. It will be noted that the sets of friction surfaces 22—32 are normal or perpendicular to the corresponding sets of friction surfaces 30 and 31. Each shoe C is provided on the inner side of the flange having the friction surface thereon with a spring-centering stud or boss 33.

The friction shell is maintained centered between the draft sills by any suitable means such as the guide plates 34—34 secured to the inner sides of the draft sills.

The operation of the shock absorbing mechanism is as follows. Upon relative approach of the followers 15 and 16 the wedge shoes B—B will be forced inwardly of the friction shell A thereby generating friction between the wedge shoes and the shell. As the wedge shoes move inwardly they force the friction shoes C also inwardly but due to the fact that the latter are in sliding contact with the surfaces 22, the shoes C are compelled to travel in a line which is perpendicular to the wedge friction surfaces 30 and 31. In other words, the members C are restricted to a straight line movement parallel to the axes of the respective springs which they are adapted to press. Obviously, relative movement occurs between the wedge shoes B and the shoes C so that there are six sets of coöperating friction surfaces in the mechanism, i. e., two each of sets 18 and 29; two each of sets 30 and 31; and two each of sets 22 and 32.

The arrangement is exceedingly compact when it is considered that I employ two springs of usual size; the device is of relatively light weight since the friction shoes can be made quite small; and the friction wearing parts are all such as may be readily produced in the foundry.

I claim:

1. In a friction shock absorbing mechanism, the combination with a single friction shell having interior longitudinally extending friction surfaces at the opposite ends thereof and provided also with oppositely arranged interior friction surfaces each inclined with respect to the axis of the shell; of a friction member at each end of the shell and slidable with respect thereto and coöperable with the corresponding longitudinally extending friction surface; a pair of friction members within the shell and each coöperable with one of said inclined friction surfaces of the shell, each of said last named friction members coöperating with one of the first named friction members; and independent spring means for yieldingly resisting movement of each of the second named friction members relatively to the shell.

2. In a friction shock absorbing mechanism, the combination with a friction member having an interior longitudinally extending friction surface and an interior friction surface inclined relatively thereto; of a friction shoe coöperable with said last named friction surface and slidable substantially diagonally of the shell, said shoe having an outer friction wedge surface; a spring extending substantially diagonally of the shell and yieldingly resisting movement of said shoe with respect to the shell; and a friction wedge shoe coöperable with said outer friction surface of the shoe and also with the shell and slidable lengthwise of the latter.

3. In a friction shock absorbing mechanism, the combination with a friction shell having longitudinally extending interior friction surfaces at each end thereof, said shell having also interior friction surfaces oppositely disposed and each extending substantially diagonally of the shell; of a pair of friction shoes within the shell, each shoe having a friction surface extending substantially diagonally of the shell and coöperable with said diagonally extending surface thereof; twin arranged springs within the shell and coöperable with said shoes, said springs extending also substantially diagonally of the shell; and friction wedge shoes at the opposite ends of the shell coöperable with the latter and with said first named friction shoes.

4. In a friction shock absorbing mechanism, the combination with a friction shell having longitudinally extending interior friction surfaces at the ends thereof; of a friction member disposed centrally within the shell and rigidly secured thereto, said friction member having oppositely arranged friction surfaces extending at an angle to the axis of the shell, said member being recessed to accommodate spring means; a pair of oppositely disposed friction shoes each having an inner friction surface and an outer friction surface, the same being substantially at right angles to each other and both extending at substantially the same angle with respect to the axis of the shell; spring means disposed within said recess and engaging said shoes; and wedge shoes coöperable with said shell and the friction shoes.

In witness that I claim the foregoing I have hereunto subscribed my name this 18th day of May, 1920.

JOHN F. O'CONNOR.

Witness:
CARRIE GAILING.